United States Patent
Terasaki

[11] Patent Number: 5,999,532
[45] Date of Patent: Dec. 7, 1999

[54] ATM LINE CONCENTRATION APPARATUS

[75] Inventor: Hiroshi Terasaki, Tokyo, Japan

[73] Assignee: NEC Corporation, Tokyo, Japan

[21] Appl. No.: 08/814,171

[22] Filed: Mar. 10, 1997

[30] Foreign Application Priority Data

Aug. 13, 1996 [JP] Japan .................................... 8-213777

[51] Int. Cl.$^6$ .................................................. H04J 3/12
[52] U.S. Cl. .......................... 370/395; 370/410; 370/420; 370/522
[58] Field of Search .................................... 370/395, 377, 370/522, 450, 533, 534, 397, 410, 420

[56] References Cited

U.S. PATENT DOCUMENTS

| 5,185,743 | 2/1993 | Murayama et al. | 370/410 |
| 5,416,771 | 5/1995 | Iwata | 370/410 |
| 5,479,402 | 12/1995 | Hata et al. | 370/399 |
| 5,504,742 | 4/1996 | Kakuma et al. | 370/420 |
| 5,513,180 | 4/1996 | Miyake et al. | 370/395 |
| 5,623,493 | 4/1997 | Kagemoto | 370/420 |

FOREIGN PATENT DOCUMENTS 6-132972   5/1994   Japan .

OTHER PUBLICATIONS

Takashi Matsumoto et al.; A Study on the Architecture of Exchanges Based on Asychronous Transfer Mode; vol. 88 No. 439; Feb. 18, 1989; pp. 13–18.

Koji Suzuki et al.; A Study on the Architecture of the ATM Switching Network; vol. 89 No. 126; Jul. 19, 1989; pp. 37–42.

*Primary Examiner*—Chi H. Pham
*Assistant Examiner*—Frank Duong

[57] ABSTRACT

An ATM line concentration apparatus includes first and second transmission path termination circuits, an ATM switch, and a signaling termination circuit. Information for execution of signaling as a procedure for establishing a switched virtual channel with respect to an ATM switching unit or a plurality of subscriber terminals in response to a call generated from the ATM switching unit or the plurality of subscriber terminals is transmitted by using the ATM switch and the signaling termination circuit through the first and second transmission path termination circuits.

7 Claims, 5 Drawing Sheets

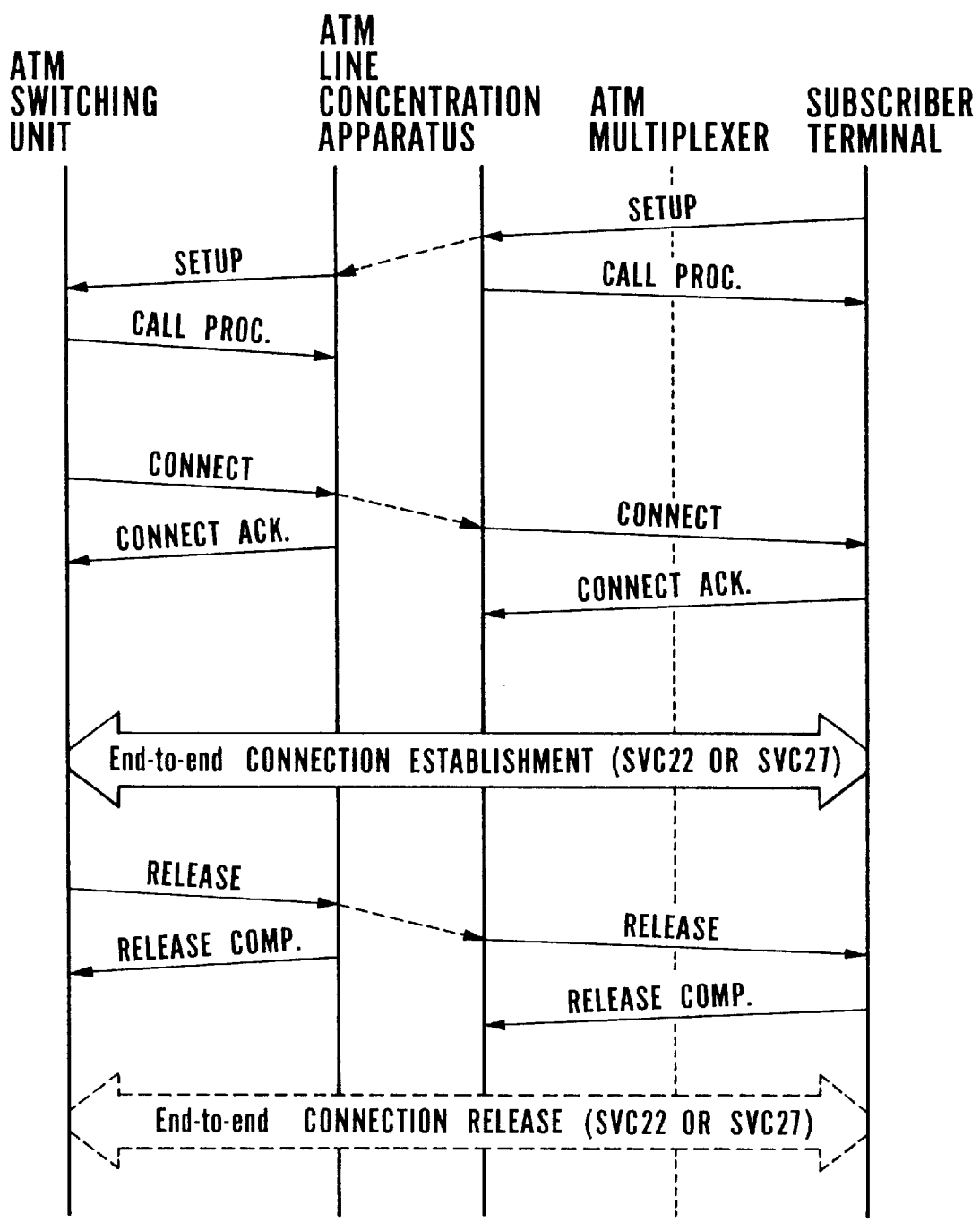

ATM LINE CONCENTRATION APPARATUS

BACKGROUND OF THE INVENTION

1. Field of the Invention

The present invention relates to a subscriber transmission apparatus and, more particularly, to an ATM line concentration apparatus in a subscriber transmission system used in a subscriber transmission network for providing broadband services using an ATM technique.

2. Description of the Prior Art

A subscriber transmission system in a subscriber transmission network for providing broadband services including VOD (Video On Demand) using a conventional ATM technique will be described below.

FIG. 1 is a block diagram showing the system configuration of a conventional broadband subscriber transmission network.

The system shown in FIG. 1 includes an ATM switching unit 41, an ATM multiplexer 43 for multiplexing/demultiplexing subscriber information, and subscriber terminals 45 to 48. The ATM multiplexer 43 includes a transmission path termination circuit 56 for terminating a transmission path 49 accommodated in the ATM switching unit 41, transmission path termination circuits 57 to 60 for terminating transmission paths 52 to 55 between the subscriber terminals 45 to 48 and the ATM multiplexer 43, an ATM cell multiplexing/demultiplexing circuit 42 for distributing or multiplexing pieces of ATM information terminated by the transmission path termination circuits 57 to 60, and ATM cell header translation circuits 61 to 64 for replacing the pieces of header information of ATM cells.

In this subscriber transmission apparatus, the total transmission capacity of the transmission path 49 accommodated in the ATM switching unit 41 is equal to the total transmission capacity of the transmission paths 52 to 55 between the subscriber terminals 45 to 48 and the ATM multiplexer 43.

FIG. 2 is a block diagram showing the arrangement of a B-ISDN remote multiplexer disclosed in Japanese Unexamined Patent Publication No. 6-132972, and more specifically, a broadband subscriber transmission network including an ATM switching unit side.

The B-ISDN remote multiplexer shown in FIG. 2 includes an ATM switching unit 141 having part of a subscriber accommodation function set in a remote place, a B-ISDN remote multiplexer 140, and a plurality of subscriber terminals 121 and 122. The ATM switching unit 141 includes a plurality of transmission interface circuits 135, an ATM switch 138, and a signaling processor 139. The B-ISDN remote multiplexer 140 includes a plurality of subscriber circuits 125, a line concentration circuit 127 and a distribution circuit 129 which constitute a concentration/distribution stage, and a transmission interface circuit 132.

The B-ISDN remote multiplexer 140 has a function equivalent to that of the ATM cell multiplexing/demultiplexing circuit 42 in FIG. 1. The B-ISDN remote multiplexer 140 distributes or multiplexes pieces of ATM information transmitted from the ATM switching unit 141 through high-speed transmission paths 133 and 134 and pieces of ATM information transmitted from the subscriber terminals 121 and 122 through line terminating units 123 and subscriber lines 124 on a cell basis.

The signaling processor 139 executes, between the subscriber terminals 121 and 122, a procedure for establishing virtual channels between the B-ISDN remote multiplexer 140 and the ATM switching unit 141 and between the B-ISDN remote multiplexer 140 and the subscriber terminals 121 and 122.

The first problem in the conventional technique is that the utilization efficiency of a transmission path connected to a subscriber terminal cannot be improved for the following reason.

The above network is simply constructed to multiplex/demultiplex pieces of subscriber service information within the range in which the amount of information does not exceed the transmission capacity of the transmission path connected to the ATM switching unit. Therefore, in a subscriber transmission network in which the service utilization efficiency is generally low, transmission capacities must also be assigned to even subscribers for which no services are provided.

The second problem in the conventional technique is that in the invention disclosed in the above official gazette, connection of a specific ATM switching unit, i.e., a unit installed in a remote place, is limited to an ATM switching unit manufactured by the same manufacturer of the specific ATM switching unit.

This is because, part of a signaling procedure between the ATM switching unit and the ATM line concentration apparatus is not based on the disclosed procedure, although an interface is based on the requirements of ATM Forum UNI.

SUMMARY OF THE INVENTION

The present invention has been made in consideration of the above situation in the above conventional technique, and has as its object to provide an ATM line concentration apparatus which allows construction of a subscriber network capable of efficiently providing a broadband service without depending on an ATM switching unit.

In order to achieve the above object, according to the basic aspect of the present invention, there is provided an ATM line concentration apparatus characterized by comprising first and second transmission path termination circuits, an ATM switch, and a signaling termination circuit, wherein information for execution of signaling as a procedure for establishing a switched virtual channel with respect to an ATM switching unit or a plurality of subscriber terminals in response to a call generated from the ATM switching unit or the plurality of subscriber terminals is transmitted by using the ATM switch and the signaling termination circuit through the first and second transmission path termination circuits.

The ATM line concentration apparatus according to the basic aspect includes the second aspect characterized in that the first transmission path termination circuit terminates a first physical transmission path accommodated in the ATM switching unit, and the second transmission path termination circuit includes a plurality of second transmission path termination circuits, and a plurality of third physical transmission paths connected to the plurality of subscriber terminals through the plurality of second physical transmission paths and accommodated in a plurality of ATM multiplexers for multiplexing/demultiplexing pieces of subscriber information are terminated.

The ATM line concentration apparatus according to the second aspect includes the third aspect characterized in that the signaling termination circuit uses information for execution of the signaling which is transmitted through the first physical transmission path or the plurality of third physical transmission paths and terminated by the first or second transmission path termination circuit so as to execute the signaling with respect to the ATM switching unit or the subscriber terminal.

The ATM line concentration apparatus according to the second aspect includes the fourth aspect characterized in that the ATM switch performs switching connection of ATM information, which is terminated by the first and second transmission path termination circuits, on an ATM cell basis by using a first switched virtual channel established with respect to the ATM switching unit by the signaling and a second switched virtual channel established with respect to the subscriber terminal by the signaling.

In the ATM line concentration apparatus according to the second aspect, when the first and third physical transmission paths are to be terminated, a total transmission capacity of the plurality of third physical transmission paths connected to the plurality of ATM multiplexers is set larger than a total transmission capacity of the first physical transmission path connected to the ATM switching unit.

With the above arrangements according to the above aspects, when service provision request information, i.e., a call, is generated from a given subscriber terminal, the service provision request information is demultiplexed from the remaining information by the transmission path termination circuit on the subscriber terminal side, and input to the ATM switch. The request information input from the subscriber terminal is switched on a cell basis and input to the signaling termination circuit. The signaling termination circuit analyzes the input request information and generates a service provision request to the ATM switching unit on the basis of the analysis result. The service provision request generated by the signaling termination circuit is input to the ATM switch, and switched on a cell basis to be input to the transmission path termination circuit on the ATM switching unit side. As a result, the information is multiplexed with other information and input to the ATM switching unit.

Similarly, service provision request reception information generated by the ATM switching unit, demultiplexed from other information by the transmission path termination circuit, and input to the ATM switch is analyzed by the signaling termination circuit and converted into line connection information for providing a service between the ATM switching unit and the subscriber terminal and service request reception information to the subscriber terminal. The line connection information for providing a service between the ATM switching unit and the subscriber terminal is sent to the ATM switch, and the service request reception information to the subscriber terminal is sent to the subscriber terminal. The ATM switch performs switching connection of service information multiplexed/demultiplexed by the transmission path termination circuit on the ATM switching unit side and the transmission path termination circuit on the subscriber terminal side on an ATM cell basis in accordance with the line connection information transmitted from the signaling termination circuit.

Since the transmission path between the ATM switching unit and the ATM line concentration apparatus is consumed only when the subscriber terminal generates a connection request, a transmission path having a transmission capacity large enough to provide services to all the subscriber terminals at once need not be prepared between the ATM switching unit and the ATM line concentration apparatus.

The first effect of the present invention is that the ATM line concentration apparatus can be connected to the ATM switching unit by using a transmission path having a transmission capacity large enough to establish an SVC for a subscriber who is to receive a service. That is, the transmission path between the ATM line concentration apparatus and the ATM switching unit can be realized with a transmission capacity smaller than the total transmission capacity of the transmission paths between the subscriber terminals and the ATM line concentration apparatus which can accommodate all the subscriber terminals. The limited transmission capacity can therefore be efficiently used to improve the utilization efficiency of transmission paths, and hence a subscriber network which allows the ATM switching unit to efficiently accommodate subscribers can be constructed.

This is because, with the use of the ATM line concentration apparatus having the signaling termination circuit and the ATM switch, a signaling procedure is executed between the ATM line concentration apparatus and the ATM switching unit to assign a band resource to only a subscriber who will receive a service only when the subscriber terminal generates a service provision request.

The second effect of the present invention is that the ATM line concentration apparatus can be connected to an ATM switching unit available from an arbitrary manufacturer. That is, the interface between the ATM line concentration apparatus and the ATM switching unit can be made open to the public. A broadband subscriber network can therefore be arbitrarily constructed without any dependence on a specific ATM switching unit.

This is because, a known procedure (the procedure based on ATM Forum UNI Ver. 3.1 in this embodiment of the present invention) is used as a signaling procedure for establishing an SVC between the ATM line concentration apparatus and the ATM switching unit.

With these effects, an ATM line concentration apparatus can be realized, which allows construction of a subscriber network capable of efficiently providing broadband services without any dependence on an ATM switching unit.

The above and many other advantages, features and additional objects of the present invention will become manifest to those versed in the art upon making reference to the following detailed description and accompanying drawings in which preferred embodiments incorporating the principles of the present invention are shown by way of illustrative example.

BRIEF DESCRIPTION OF THE DRAWINGS

FIG. 5 is a timing chart showing the signaling flow in the embodiment in FIG. 3.

DETAILED DESCRIPTION OF THE PREFERRED EMBODIMENT

The preferred embodiment of the present invention will be described below with reference to the accompanying drawings.

Figure 1:
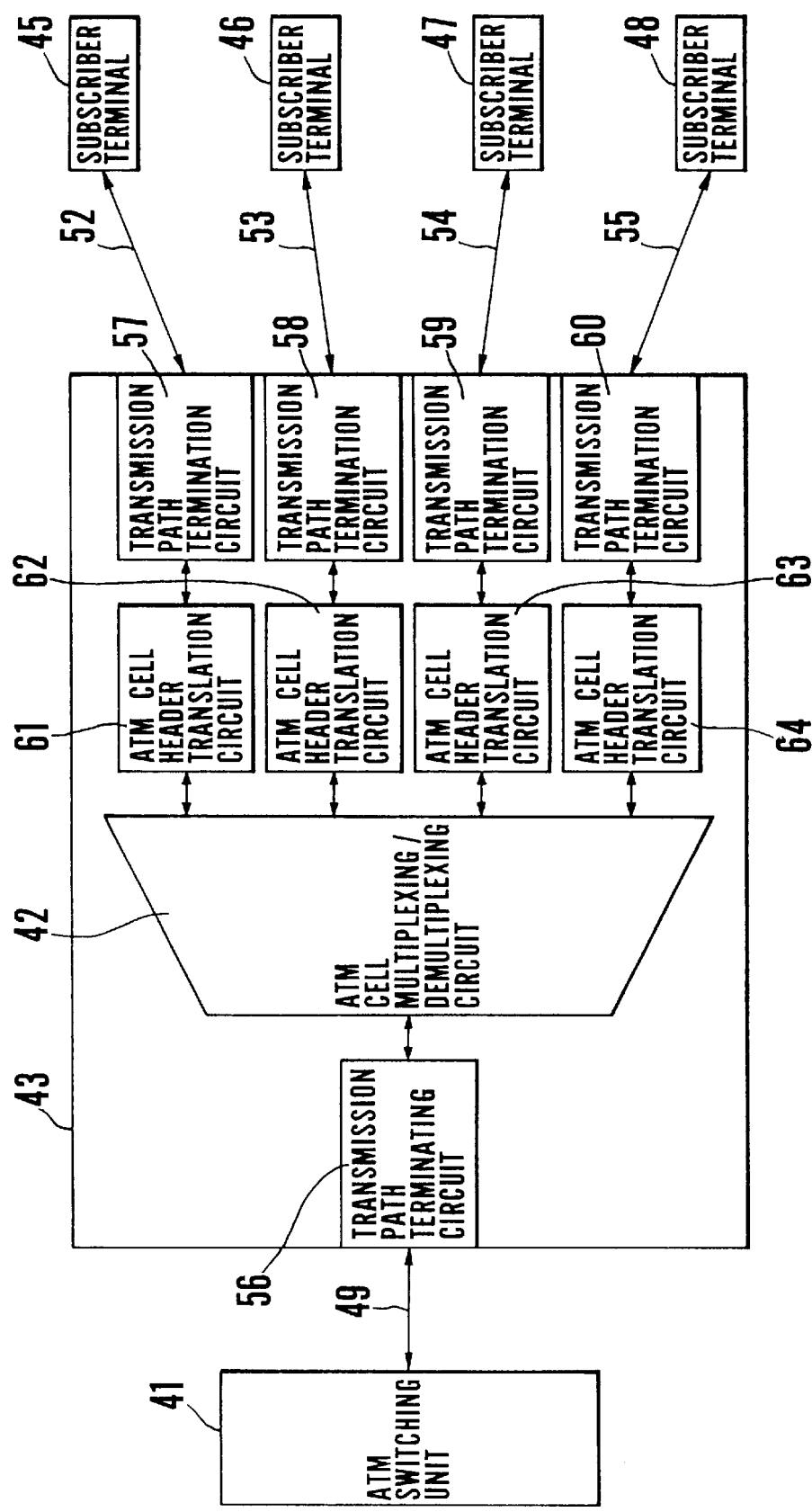
FIG. 1 is a block diagram showing the system configuration of a conventional broadband subscriber transmission network.
Figure 2:
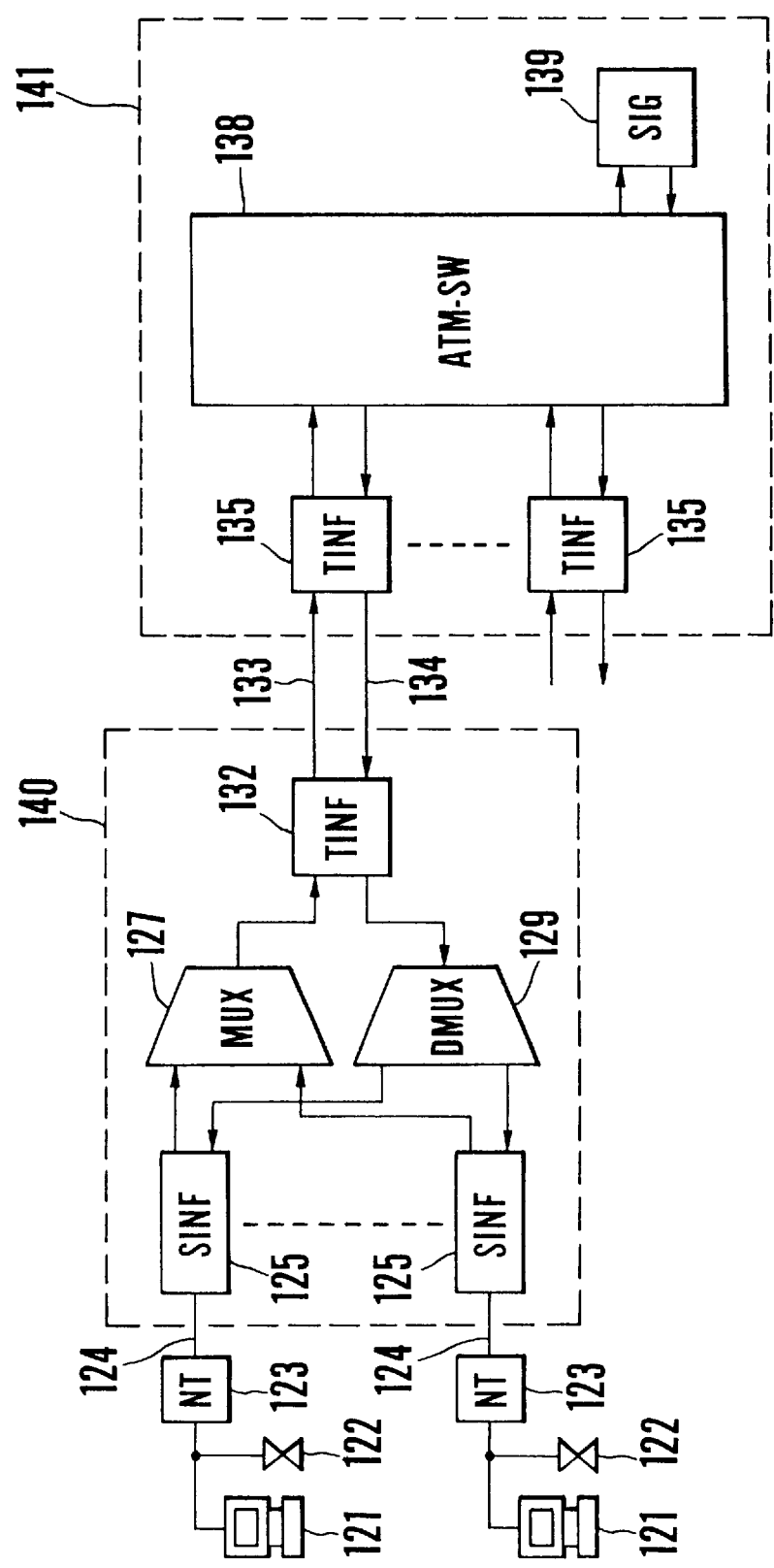
FIG. 2 is a block diagram showing a B-ISDN remote multiplexer disclosed in Japanese Unexamined Patent Publication No. 6-132972.
Figure 3:
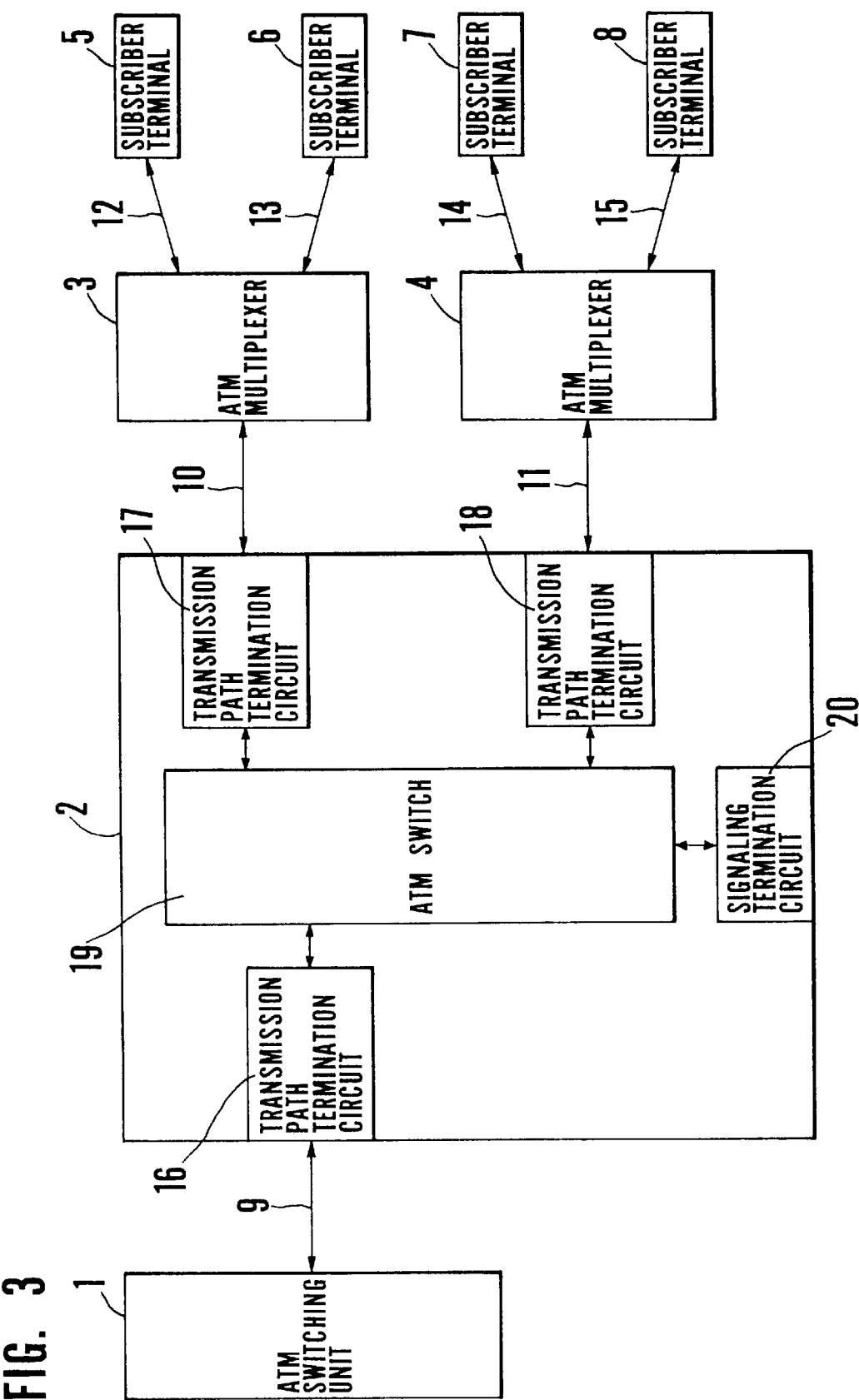
FIG. 3 is a block diagram showing the system configuration of a broadband subscriber transmission network according to an embodiment of the present invention.

The arrangement of the embodiment of the present invention will be described first. FIG. 3 is a block diagram showing the system configuration of a broadband subscriber transmission network according to this embodiment.

The system shown in FIG. 3 includes an ATM switching unit 1, an ATM line concentration apparatus 2, ATM multiplexers 3 and 4, and subscriber terminals 5 to 8. The ATM line concentration apparatus 2 includes transmission path termination circuits 16 to 18, an ATM switch 19, and a signaling termination circuit 20.

Referring to FIG. 3, the system includes the two ATM multiplexers 3 and 4, and the two pairs of subscriber terminals 5 and 6, and 7 and 8 are respectively connected to the ATM multiplexers 3 and 4. However, the number of subscriber terminals to be connected is not limited to this. For example, the system may includes 28 ATM multiplexers, and 96 subscriber terminals may be connected to each ATM multiplexer.

The ATM switching unit 1 is connected to the ATM line concentration apparatus 2 through a transmission path 9 having a limited transmission capacity. The transmission path 9 is terminated by the transmission path termination circuit 16. The ATM line concentration apparatus 2 is connected to the ATM multiplexer 3 through a transmission path 10 having a limited transmission capacity. The transmission path 10 is terminated by the transmission path termination circuit 17. The ATM line concentration apparatus 2 is connected to the ATM multiplexer 4 through a transmission path 11 having a limited transmission capacity. The transmission path 11 is terminated by the transmission path termination circuit 18. The ATM multiplexer 3 and the subscriber terminals 5 and 6 are connected to each other through transmission paths 12 and 13. The ATM multiplexer 4 and the subscriber terminals 5 and 6 are connected to each other through transmission paths 14 and 15. The transmission paths 12 to 15 connected to the subscriber terminals 5 to 8 are temporarily accommodated in the ATM line concentration apparatus 2 through the ATM multiplexers 3 and 4. The single transmission path 9 from the ATM line concentration apparatus 2 is accommodated in the ATM switching unit 1.

Referring to FIG. 3, although connection of the transmission paths 9 to 11 is not specifically described, for example, the transmission path 9 extending from the ATM line concentration apparatus 2 to the ATM switching unit 1 may be connected according to STM-4, and the transmission paths 10 and 11 extending from the ATM multiplexers 3 and 4 to the ATM line concentration apparatus 2 may be connected according to STM-1.

In this case, the transmission capacity of the transmission path 10 is equal to the sum of the transmission capacity of the transmission path 12 and the transmission capacity of the transmission path 13. The transmission capacity of the transmission path 11 is equal to the sum of the transmission capacity of the transmission path 14 and the transmission capacity of the transmission path 15.

The ATM multiplexers 3 and 4 perform VP multiplexing/demultiplexing processing, and replace a common VPI value assigned to each of the subscriber terminals 5 to 8 in advance with a new VPI value for each subscriber terminal.

The transmission path termination circuit 16 multiplexes information on the transmission path 9 or demultiplexes information therefrom. The transmission path termination circuits 17 and 18 respectively multiplex pieces of information on the transmission paths 10 and 11 or demultiplex pieces of information therefrom. Termination of main signals transmitted through the transmission paths 9 to 11 is performed as follows. As for termination on the physical layer, SDH signal termination, cell synchronization in a signal consisting of consecutive ATM cells, HEC byte calculation, and the like are performed. As for termination on the ATM layer, processing of ATM_OAM cell and cell multiplexing/demultiplexing on a VP/VC basis are performed.

The signaling termination circuit 20 executes a signaling procedure between the ATM switching unit 1 and the ATM line concentration apparatus 2 and between the subscriber terminals 5 to 8 and the ATM line concentration apparatus 2 to establish virtual channels (VCs) therebetween. In performing this signaling termination, the following control operations are performed: congestion control and transfer order assurance of signaling messages from a plurality of subscribers; and VC establishment request reception control and protocol fault control of signaling messages transmitted from the ATM switching unit 1.

The ATM switch 19 switches pieces of ATM information terminated by the transmission path termination circuits 16 to 18 on a cell basis, and crossconnects ATM cells to the transmission path termination circuits 16 to 18 and the signaling termination circuit 20. In performing this VC crossconnecting operation, the ATM switch 19 dynamically replaces a VPI/VCI value arbitrarily assigned to a given subscriber in advance with a VPI/VCI value assigned every time a VC is established with respect to the ATM switching unit 1. In this case, the VPI/VCI value between the ATM switching unit 1 and the ATM line concentration apparatus 2 is designated by the ATM switching unit 1 by a signaling procedure executed by the ATM line concentration apparatus 2 with respect to the ATM switching unit 1 every time a VC for providing a service is established.

Figure 4:
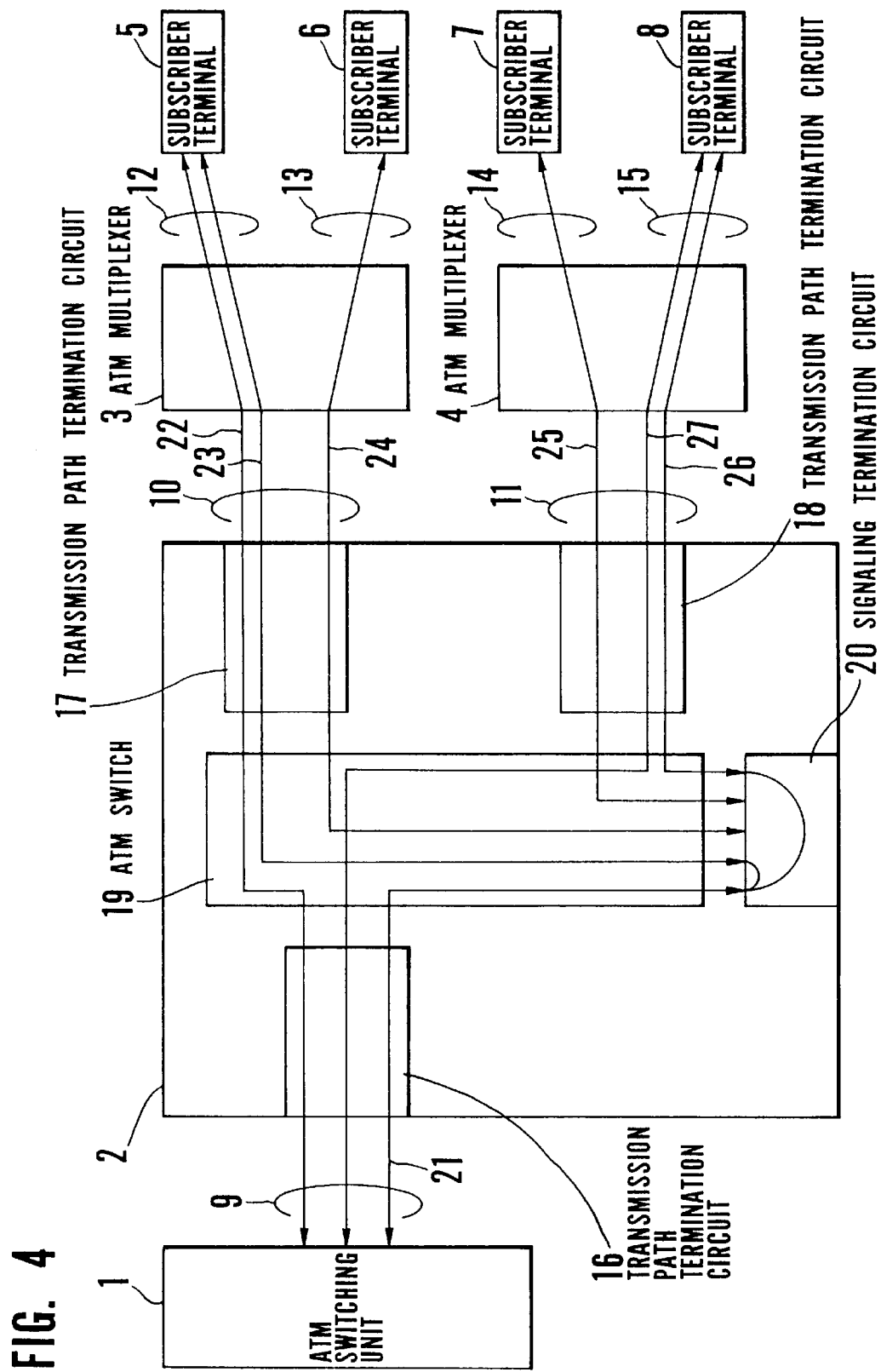
FIG. 4 is a block diagram for explaining the operation of the embodiment in FIG. 3.

The operation of the above embodiment of the present invention will be described next. FIG. 4 is a block diagram for explaining the operation of the broadband subscriber transmission network according to the embodiment of the present invention shown in FIG. 3, and more specifically, showing the states of virtual channels on the transmission paths 9 to 15 and the switching state of the ATM switch 19 in the same system configuration as that shown in FIG. 3. Operations to be performed when a VC establishment request and a VC release request are output will be described with reference to FIG. 4.

In this embodiment, a signaling procedure for VC establishment is executed between the ATM line concentration apparatus 2 and the ATM switching unit 1 in accordance with each of service provision requests output from the respective subscriber terminals 5 to 8, and a band resource is assigned to only a subscriber terminal which is to receive a service. This operation will be described below.

Referring to FIG. 4, a connection request transmitted from the subscriber terminal 5 is terminated and extracted by the transmission path termination circuit 17 through a permanent virtual channel (to be referred to as a PVC hereinafter) 23 for signaling which is arbitrarily assigned between the subscriber terminal 5 and the ATM line concentration apparatus 2. The extracted connection request information is input to the ATM switch 19 and subjected to switching on a cell basis to be output to the signaling termination circuit 20. The signaling termination circuit 20 establishes a switched virtual channel (to be referred to as a SVC hereinafter) between the ATM line concentration apparatus 2 and the subscriber terminal 5 on the basis of the received connection request information.

The signaling termination circuit 20 outputs the connection request information for the ATM switching unit 1 to the ATM switch 19. The ATM switch 19 switches the connection request information input from the signaling termination circuit 20 on a cell basis. The resultant information is input to the transmission path termination circuit 16 to be multiplexed. The multiplexed information is transmitted to the ATM switching unit 1 through a PVC 21 for signaling which is assigned between the ATM switching unit 1 and the ATM line concentration apparatus 2. The ATM switching unit 1 establishes an SVC between the ATM switching unit 1 and the ATM line concentration apparatus 2 on the basis of the received connection request information.

After the SVC is established between the ATM switching unit 1 and the ATM line concentration apparatus 2, the ATM switching unit 1 transmits connection completion information to the signaling termination circuit 20 through the PVC 21. The signaling termination circuit 20 requests the ATM switch 19 to connect the SVC on the basis of the received connection completion information. With this operation, the SVC established between the ATM switching unit 1 and the ATM line concentration apparatus 2 is connected to the SVC established between the ATM line concentration apparatus 2 and the subscriber terminal 5 by the ATM switch 19, thereby establishing an SVC 22 for providing a higher layer service between the ATM switching unit 1 and the subscriber terminal 5.

After this processing, the signaling termination circuit 20 generates connection completion information indicating that connection of the SVC 22 is completed, and notifies the subscriber terminal 23 of the information through the same route as that of the connection request and the PVC 23.

When a call is generated from the subscriber terminal 8, connection request information is passed from the subscriber terminal 8 to the signaling termination circuit 20 in the ATM line concentration apparatus 2 and to the ATM switching unit 1 through a PVC 26 for signaling and the PVC 21. Connection completion information is then passed from the ATM switching unit 1 to the signaling termination circuit 20 in the ATM line concentration apparatus 2 and to the subscriber terminal 8, thereby establishing an SVC 27 for providing a higher layer service.

When connection to the subscriber terminal 5 or 8 becomes unnecessary, a connection release request is passed from the ATM switching unit 1 to the signaling termination circuit 20 in the ATM line concentration apparatus 2 and to the subscriber terminal 5 or 8 through the PVC 23 or 26 and the PVC 21. As a result, the SVC 22 or 27 is released and reused for connection to another subscriber terminal.

FIG. 5 is a timing chart showing the signaling flows in the broadband subscriber transmission network according to the embodiment of the present invention shown in FIG. 3, and more specifically, the signaling flows upon generation of a VC establishment request and a VC release request in the system shown in FIG. 4.

In this embodiment, the ATM switching unit 1, the ATM line concentration apparatus 2, and the subscriber terminals 5 to 8 are to establish SVCs in accordance with the signaling procedure based on ATM Forum UNI Ver. 3.1. In addition, a VPI value given by VPI=0 is assigned to each of the subscriber terminals 5 to 8 in advance.

The operation will be described below with reference to FIGS. 4 and 5. A connection request generated by the subscriber terminal 5 is terminated and extracted as a SETUP message by the transmission path termination circuit 17 through the PVC 23 (VPI=0; VCI=5) arbitrarily assigned between the subscriber terminal 5 and the ATM line concentration apparatus 2 in advance. The extracted SETUP message is input to one port of the ATM switch 19 to be switched on a cell basis. The SETUP message is then output from the VPI/VCI of the arbitrarily assigned port of the ATM switch 19 to be passed to the signaling termination circuit 20. The signaling termination circuit 20 returns, to the subscriber terminal 5, a CALL PROCEEDING (to be referred to as CALL PROC. hereinafter) message indicating that reception of the SETUP message is completed, through the same route as that of the SETUP message and the PVC 23 (VPI=0; VCI=5). Upon returning the CALL PROC. message, the signaling termination circuit 20 establishes an SVC between the ATM line concentration apparatus 2 and the subscriber terminal 5 on the basis of the received SETUP message.

The signaling termination circuit 20 outputs the SETUP message for the ATM switching unit 1 to the VPI/VCI of the arbitrary assigned port of the ATM switch 19. The SETUP message input from the signaling termination circuit 20 is switched by the ATM switch 19 on a cell basis, and input to the transmission path termination circuit 16 to be multiplexed. The multiplexed SETUP message is transmitted to the ATM switching unit 1 through the PVC 21 (VPI=0; VCI=5) assigned between the ATM switching unit 1 and the ATM line concentration apparatus 2. The ATM switching unit 1 returns, to the signaling termination circuit 20, a CALL PROC. message indicating that reception of the SETUP message is completed, through the same route as that of the SETUP message and the PVC 21 (VPI=0; VCI=5). Upon returning the CALL PROC. message, the ATM switching unit 1 establishes an SVC between the ATM switching unit 1 and the ATM line concentration apparatus 2 on the basis of the received SETUP message.

Upon establishing an SVC between the ATM switching unit 1 and the ATM line concentration apparatus 2, the ATM switching unit 1 generates a CONNECT message, and transmits the message to the signaling termination circuit 20 through the same route as that of the CALL PROC. message and the PVC 21 (VPI=0; VCI=5). The signaling termination circuit 20 returns, to the ATM switching unit 1, a CONNECT ACK. message indicating that reception of the CONNECT message is completed, through the same route as that of the CONNECT message and the PVC 21 (VPI=0; VCI=5). Upon returning the CONNECT ACK. message, the signaling termination circuit 20 requests the ATM switch 19 to connect an SVC to the ATM switch 19 on the basis of the received CONNECT message. With this processing, the SVC established between the ATM switching unit 1 and the ATM line concentration apparatus 2 is connected to the SVC established between the ATM line concentration apparatus 2 and the subscriber terminal 5 through the ATM switch 19, and the SVC 22 is established between the ATM switching unit 1 and the subscriber terminal 5.

Subsequently, the signaling termination circuit 20 generates a CONNECT message indicating that the SVC 22 has been established, and notifies the subscriber terminal 5 of the message through the same route as that of the CALL PROC. message and the PVC 23 (VPI=0; VCI=5).

Similarly, when a call is generated from the subscriber terminal 8, a SETUP message and a CONNECT ACK. message are passed from the subscriber terminal 8 to the signaling termination circuit 20 in the ATM line concentration apparatus 2 and to the ATM switching unit 1 through the PVC 26 (VPI=0; VCI=5) and the PVC 21 (VPI=0; VCI=5). A CALL PROC. message and a CONNECT message are passed from the ATM switching unit 1 to the signaling termination circuit 20 in the ATM line concentration apparatus 2 and to the subscriber terminal 8, thereby establishing the SVC 27.

If connection of the subscriber terminal 5 or 8 becomes unnecessary, a RELEASE message is passed from the ATM switching unit 1 to the signaling termination circuit 20 in the ATM line concentration apparatus 2 and to the subscriber terminal 5 or 8 through the PVC 23 (VPI=0; VCI=5) or the PVC 26 (VPI=0; VCI=5) and the PVC 21 (VPI=0; VCI=5). A RELEASE COMPLETE (RELEASE COMP.) message is passed from the subscriber terminal 5 or 8 to the signaling termination circuit 20 in the ATM line concentration apparatus 2 and to the ATM switching unit 1, thereby releasing the SVC 22 or 27, which is reused for connection of another subscriber terminal.

What is claimed is:

1. An ATM line concentration apparatus interposed between an ATM switching unit and a plurality of subscriber terminals, comprising:

a first transmission path termination circuit;

a second transmission path termination circuit;

an ATM switch operative for connecting together and disconnecting said termination circuits, and a signaling termination circuit connected for two way communication with said ATM switch, wherein information for execution of signaling as a procedure for establishing a switched virtual channel with respect to said ATM switching unit or said plurality of subscriber terminals in response to a call generated from said ATM switching unit or said plurality of subscriber terminals, is transmitted through said first and second transmission path termination circuits by using said ATM switch and said signaling termination circuit.

2. An apparatus according to claim 1, wherein said first transmission path termination circuit terminates a first physical transmission path accommodated in said ATM switching unit, and said second transmission path termination circuit includes a plurality of second transmission path termination circuits, and a plurality of third physical transmission paths connected to said plurality of subscriber terminals through said plurality of second physical transmission paths and accommodated in a plurality of ATM multiplexers for multiplexing/demultiplexing pieces of subscriber information are terminated.

3. An apparatus according to claim 2, wherein said signaling termination circuit uses information for execution of the signaling which is transmitted through the first physical transmission path or the plurality of third physical transmission paths and terminated by said first or second transmission path termination circuit so as to execute the signaling with respect to said ATM switching unit or said subscriber terminal.

4. An apparatus according to claim 2, wherein said ATM switch performs switching connection of ATM information, which is terminated by said first and second transmission path termination circuits, on an ATM cell basis by using a first switched virtual channel established with respect to said ATM switching unit by the signaling and a second switched virtual channel established with respect to said subscriber terminal by the signaling.

5. An apparatus according to claim 3, wherein said ATM switch performs switching connection of ATM information, which is terminated by said first and second transmission path termination circuits, on an ATM cell basis by using a first switched virtual channel established with respect to said ATM switching unit by the signaling and a second switched virtual channel established with respect to said subscriber terminal by the signaling.

6. An apparatus according to claim 2, wherein when the first and third physical transmission paths are to be terminated, a total transmission capacity of the plurality of third physical transmission paths connected to said plurality of ATM multiplexers is set larger than a total transmission capacity of the first physical transmission path connected to said ATM switching unit.

7. An apparatus according to claim 4, wherein when the first and third physical transmission paths are to be terminated, a total transmission capacity of the plurality of third physical transmission paths connected to said plurality of ATM multiplexers is set larger than a total transmission capacity of the first physical transmission path connected to said ATM switching unit.

* * * * *